United States Patent [19]
Takahashi et al.

[11] Patent Number: 5,755,082
[45] Date of Patent: May 26, 1998

[54] MANUFACTURING EQUIPMENT FOR CUSHIONING MATERIAL

[75] Inventors: Jiro Takahashi; Yukio Tahara; Tsuyoshi Mizutani; Itsuku Ohtawa; Akira Aoyama; Norikazu Yamagishi. all of Kanagawa, Japan

[73] Assignee: Hitachi Electronics Services Co., Ltd., Kanagawa, Japan

[21] Appl. No.: 784,762

[22] Filed: Jan. 16, 1997

[30] Foreign Application Priority Data

Feb. 1, 1996 [JP] Japan ................... 8-016491

[51] Int. Cl.$^6$ .................................. B65B 31/00
[52] U.S. Cl. ................. 53/511; 53/79; 53/139.5; 53/550; 53/551
[58] Field of Search ............... 383/1, 3; 206/1; 53/79, 139.5, 403, 433, 511, 550, 551, 552

[56] References Cited

U.S. PATENT DOCUMENTS

| | | | |
|---|---|---|---|
| 3,389,534 | 6/1968 | Pendleton | 53/79 X |
| 3,575,757 | 4/1971 | Smith | 53/79 X |
| 3,817,803 | 6/1974 | Horsky | 53/79 X |
| 3,938,298 | 2/1976 | Luhman et al. | 53/79 X |
| 4,847,126 | 7/1989 | Yamashiro et al. | 383/3 X |
| 5,170,609 | 12/1992 | Bullock et al. | 53/511 X |
| 5,216,868 | 6/1993 | Cooper et al. | 53/79 |
| 5,387,147 | 2/1995 | Ohshima et al. | 383/1 X |
| 5,427,830 | 6/1995 | Pharo | 383/3 X |
| 5,445,274 | 8/1995 | Pharo | 383/3 X |
| 5,581,983 | 12/1996 | Murakami | 53/139.5 X |

*Primary Examiner*—Daniel Moon
*Attorney, Agent, or Firm*—Antonelli, Terry, Stout, & Kraus, LLP

[57] ABSTRACT

Equipment which automatically manufactures cushioning material by filling air inside polyvinyl alcohol laminated paper and sealing the filled material into individual bags. The manufacturing equipment 1 is provided with a material roll 20 on which a sheet material of polyvinyl alcohol laminated paper is wound. The sheet material 10 is rolled out by a feeding roller 40 from the material roll 20, and the sheet material 10 in a known length, adjusted by a length adjusting device 50 having a roller 42 which goes up and down, is supplied intermittently to a bag forming device 100 located downstream thereof. The bag forming device 100 is provided with a pipe member 105 and a sailor 110, which is a guide plate to reverse the sheet material 10 and form it into a tubular shape, and the sheet material 10 is fed along the pipe member 105 after being formed into a tubular shape. Feed rollers 130 and auxiliary belt 120 are arranged at the periphery of the pipe member 105. The feed rollers 130 catch the superposed sections of both edges of the sheet material formed into a tubular shape and feed the material, inserting the superposed section into a center sealer 150. The center sealer 150 is provided with a heater and welds together the superposed sections. As a result of this welding, the sheet material is formed into a long tube. The center sealed tubular sheet material is further sent downstream from the lower end of the pipe member 105. Air is supplied from the top of the pipe member 105, and the air is filled inside the tubular sheet material. In such condition, the sheet material is sent to the end sealer/cutter. The end sealer/cutter 160 is provided with a pair of end sealers facing each other which weld the tubular sheet material into a bag shape and cut the material into individual bags with a cutter 165. At this time, the air amount is adjusted by the filled air amount adjusting device 170. The air filled cushioning material 200 is sent to the next process by a conveyor 210.

9 Claims, 6 Drawing Sheets

MANUFACTURING EQUIPMENT FOR CUSHIONING MATERIAL

FIELD OF THE INVENTION

This invention relates to manufacturing equipment for cushioning material made mainly of paper and having air sealed inside.

BACKGROUND OF THE INVENTION

While the distribution of spare parts is increasing year by year, the method of packaging those parts has remained unchanged, in that the parts are put in a carton box, and cushioning material and sealing material are stuffed in gaps to protect the parts from shifting inside the box and from being affected by vibration from outside.

Generally speaking, the cushioning material used for packaging can be categorized into two groups, granular cushioning material put in the carton box as is, and sheet type cushioning material which is used for wrapping the parts which are then put in the carton box.

Furthermore, cushioning material can be categorized in terms of raw material into the plastic family, the paper family and starch the family. Granular sheet type cushioning material of polystyrene foam (EPS), polyethylene foam (EPE), polypropylene foam (EPP), a copolymer between ethylene and styrene, and polyurethane in the plastic family, sheet type cushioning material of corrugated cardboard, molded pulp, threefold kraft paper, paper core, etc. in the paper family, and granular type cushioning material of hybrid corn starch in the starch family are commonly used.

From the aspect of ease of distribution, a throwaway system is employed for cushioning and packaging material, and it is disposed of when its role of protecting the package contents during transportation is accomplished. In the meantime, space for storage and disposal of cushioning material have become a major problem because of the volume, which is greater than that of the packaging material.

Now, looking back on the cushioning material as listed above, while the paper and starch families are inferior to the plastic family in terms of water resistance and heat insulation, paper and starch generate less heat when incinerated, and they are collectable as ordinary waste and recyclable, and also the starch family, in particular, is biodegradable and easily disposed of.

On the other hand, cushioning material of the plastic family has the problems of generating high heat when incinerated, being impossible to be incinerated in an ordinary incinerator, plus being difficult to recycle when disposed as industrial waste, while the performance and stability as a cushioning material are superior.

SUMMARY OF THE INVENTION

Under such circumstances, studies have been made for space saving in the storage of packaging and cushioning material, and for selection of material which is less bulky, recyclable and separable, as a means to cope with the waste disposal issue.

On top of that, development of a packaging material which adequately protects the package contents physically and chemically, from a static point of view, and which does not convey dynamic impact of dropping to the contents, and development of a cushioning material which absorbs dynamic impact are required.

For example, official gazette TOKU-KAI-HEI 7-189182 discloses a laminated paper usable as cushioning material.

The purpose of this invention is to provide manufacturing equipment for cushioning material which is water resistant, air tight, biodegradable, and less bulky, has high performance in absorbing impact force, is superior in protective function of the package contents, and is easily disposable and recyclable.

The manufacturing equipment for cushioning material of this invention basically consists of a device which feeds out a sheet material of polyvinyl alcohol laminated paper from a material roll, means to form a tube of the fed sheet material, a pipe member which is placed inside the sheet material formed into a tube, a center sealer which is located outside of the pipe member and seals both edges of the tubular sheet material, a blower which is located at the entrance side of the pipe and blows air into the tubular sheet material, an end sealer/cutter which is located at the exit side of the pipe and holds the center sealed sheet material between its fingers and seals the opening, and then cuts the material into a separate bag shaped cushioning material, and an air adjusting device which adjusts the air volume to be filled into the cushioning material.

Furthermore, the air adjusting device has the function of adjusting the thickness of the tubular sheet material in combination with the end sealer/cutter.

BEST MODE OF THE INVENTION

Figure 1:
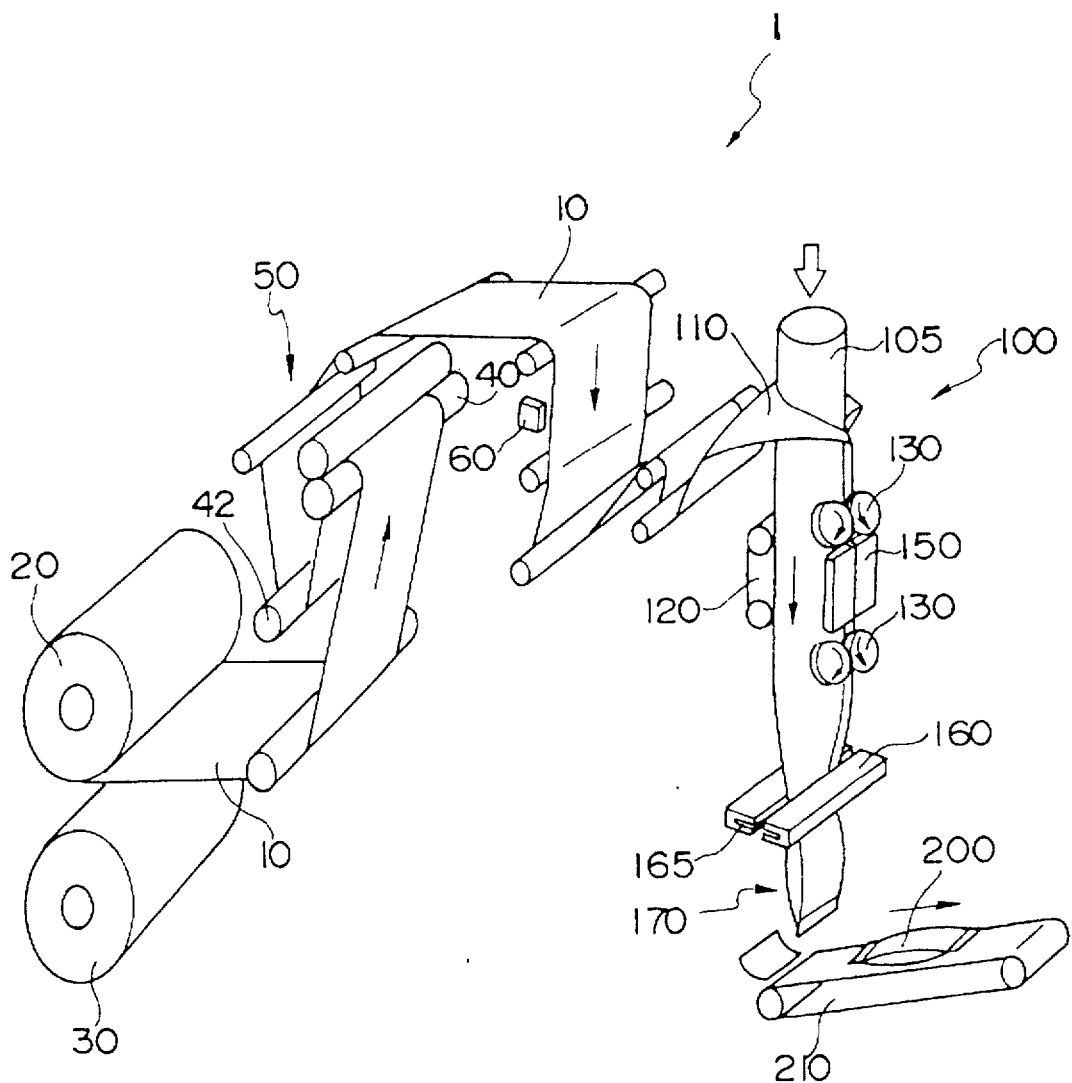
FIG. 1 is a schematic drawing usable in describing the basic configuration of a first embodiment the manufacturing equipment of this invention.

FIG. 1 is a schematic drawing showing the basic configuration of the manufacturing equipment of a first embodiment of this invention.

The manufacturing equipment, which is generally designated 1, is provided with a material roll 20 around which the sheet material 10 of polyvinyl alcohol (PVA) laminated paper is wound, and the roll 20 is supported on a support roll 30 in a way that roll 20 can freely rotate.

The sheet material 10 is rolled out from the material roll 20 by a feeding roller 40, and a certain length of sheet material 10, adjusted by a length adjusting device 50 having a roller 42 which goes up and down, is supplied intermittently to the bag forming device 100 located downstream thereof.

The bag forming device 100 comprises a pipe member 105 and a sailor 110 which is a guide plate that reverses the sheet material 10 and the sheet material 10 is made into a tube and fed along the pipe member 105.

Feed roller 130 and auxiliary belt 120 are located along the periphery of the pipe member 105. The feed roller 130 feeds the tube formed sheet material by catching the superposed section of both edges of the sheet material and inserts the superposed section into the center sealer 150. The center sealer 150 is provided with a heater, and welds together the superposed section. As a result of this welding, the sheet material is made into a long tube. The tubular sheet after center sealing is fed further downstream from the lower end of the pipe member 105.

Air is supplied into the pipe member 105 from the top, resulting the tubular sheet material being filled with air.

In this condition, the sheet material is fed to the end sealer/cutter 160. The end sealer/cutter 160 is provided with a pair of end sealers facing each other which weld the end of the tubular sheet material to make a bag, and separate the material into individual bags by a cutter 165. At this time, the air volume is adjusted by the filling amount adjusting device 170.

The air filled cushioning material 200 is sent to a further process by a conveyor 210.

Figure 2:
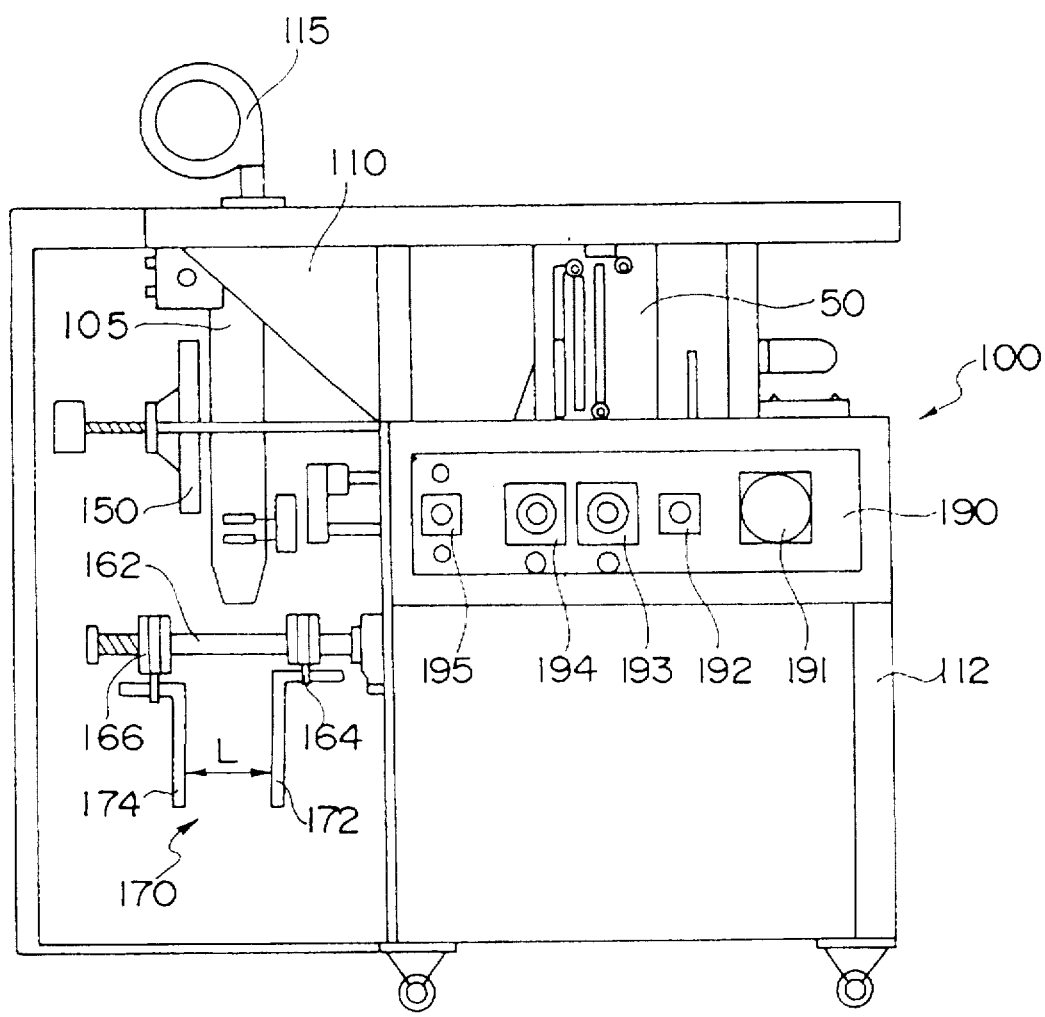
FIG. 2 is a front view of the manufacturing equipment for cushioning material of this invention.
Figure 3:
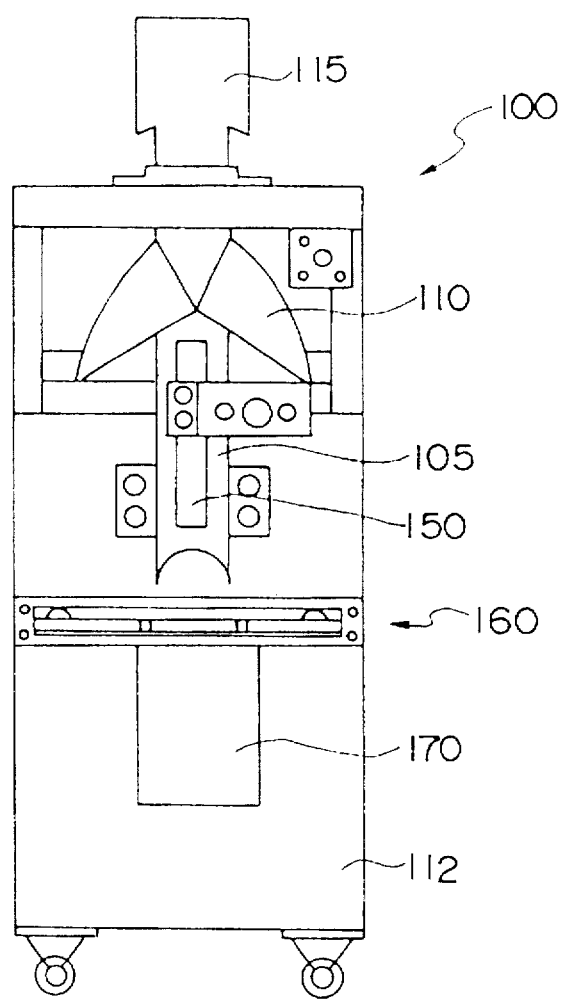
FIG. 3 is a left side view of the manufacturing equipment for cushioning material of this invention.

FIG. 2 is a front view drawing and FIG. 3 is a left side view drawing of the manufacturing equipment for cushioning material of this invention.

The bag forming device 100 is provided with a sheet material feeder and a feeding length adjusting device 50 on the upper section of a frame 112. The fed out sheet material is curved into a tube form by the sailor 110, and both edges of the sheet material, curved into a tube and wound around the periphery of the pipe member 150, are welded together by the center sealer 150, and the material is further sent downstream from the pipe member 105 as a welded and sealed pipe. Air blower 115 is located at the top end of the pipe member 105 to blow air into the pipe 105.

This air is filled into the pipe shaped sheet material from the lower end of the pipe 105.

The end sealer/cutter members 160 is provided with a pair of sealer/cutter, 164 and 166, which slide along a guide 162 to catch and weld the upper edge of the pipe shaped sheet material and to cut the sheet material by the center section 165 of the sealer/cutter making a bag shaped cushioning material.

An adjusting device for the filling air, consisting of a pair of adjusting plates 172 and 174, is provided on the pair of end sealer/cutter member 164 and 166, which are driven in the direction toward and away from each other.

These adjusting plates 172 and 174 adjust the air volume remaining in the bag by pushing out the air inside the sheet material by holding the pipe shaped sheet material as it is fed and filled with air and the bottom part sealed.

By changing the distance L between the adjusting plates 172 and 174, the bag thickness can be changed and the air volume can be adjusted.

Operating panel 190 is provided the front face of the frame 112, on and includes a product counter 191, an extension timer 192, an adjusting switch 193 for the end sealer/cutter, an adjusting switch 194 for the center sealer, and an adjusting switch 195 for the bag length.

Figure 4:
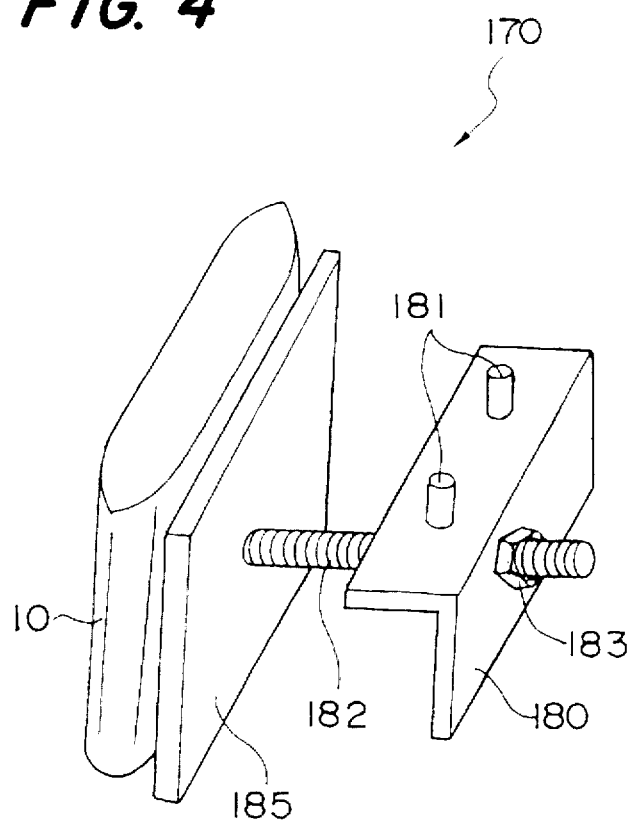
FIG. 4 is a perspective view showing the detailed construction of the air adjusting device.
Figure 5:
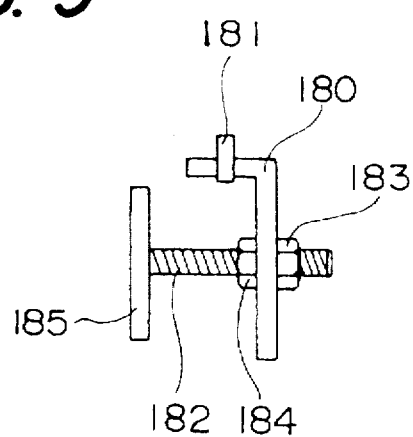
FIG. 5 is a side view showing the detailed construction of the air adjusting device.

FIG. 4 is a perspective view and FIG. 5 is a side view showing the detailed construction of the air adjusting device 170.

The air adjusting device 170 is provided with a base plate 180, which is fixed to the end sealer/cutter member via a bolt 181, and a backplate 185, which is mounted to a bolt 182 piercing through the base plate 180. Two nuts, 183 and 184, which are screwed onto the bolt 182, catch the base plate 180 from both sides and adjust the distance between the base plate 180 and the backplate 185.

By adjusting the position between the backplate 185 and the sealer/cutter member, the bag thickness can be changed and the air filled volume can be changed.

Figure 6:
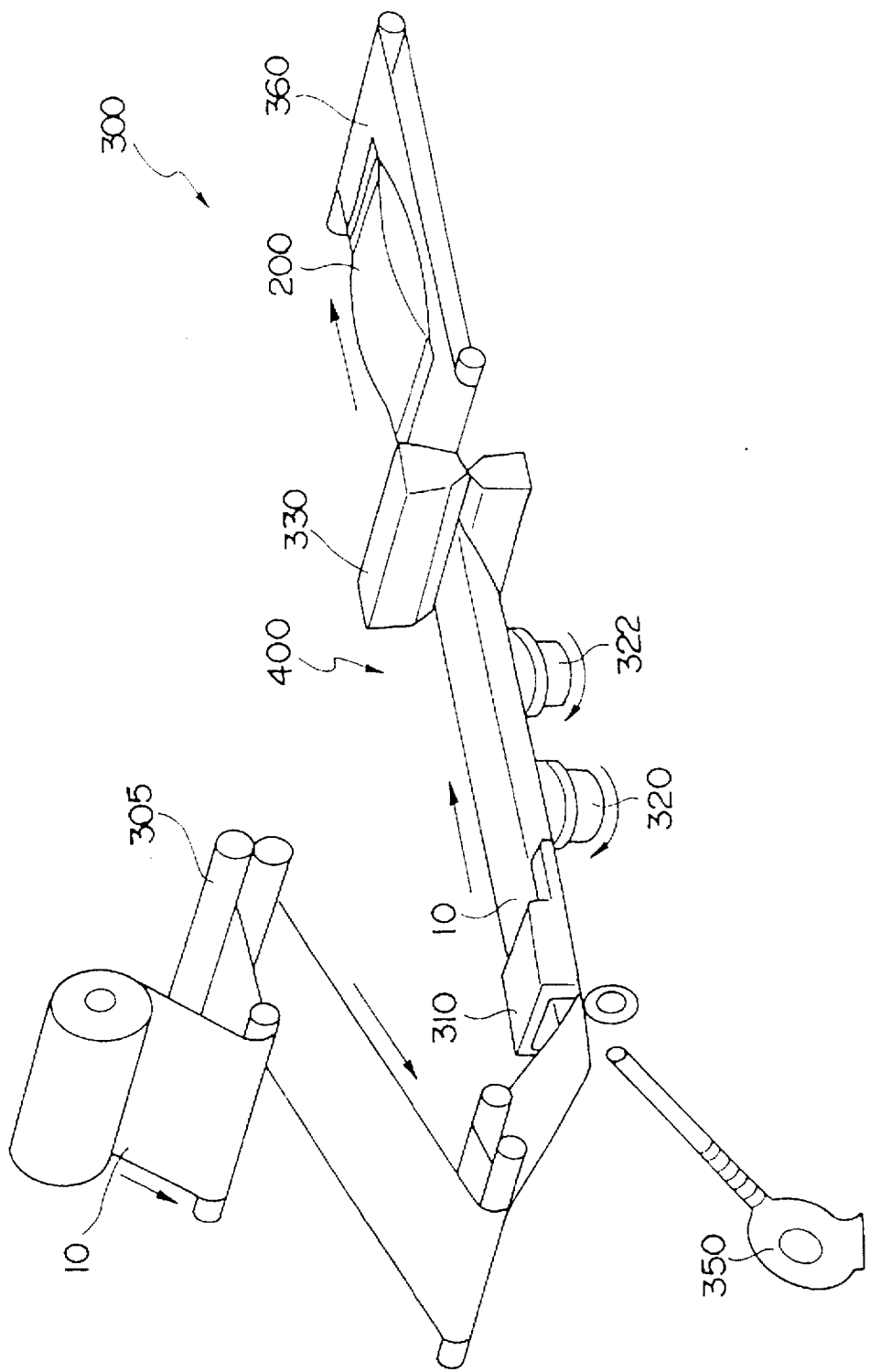
FIG. 6 is a schematic drawing showing a manufacturing equipment of a second embodiment of this invention.

FIG. 6 is a schematic drawing showing a manufacturing equipment of a second embodiment of this invention.

This manufacturing equipment 300 feeds the sheet material 10 to the bag forming device 310 by a sheet material feeding roller 305. The bag forming device 310 is placed horizontally in the case of this equipment, and the bag forming device 310 forms the sheet material 10 into a tube.

The sheet material 10 formed into a tube is center sealed between the feeding roller 320 and the center seal roller 322.

Air blower 350 is located at the upstream side of the bag forming device 310 and fills the air into the tubular sheet material. While the tubular sheet material after center sealing passes the air adjusting device 400, the bag thickness is adjusted and the air filled volume is adjusted.

Then, the tubular sheet material is sealed and separated into individual bags by the end sealer/cutter 330. The cushioning material 200, which is a product, is sent to for further processing by the ejection conveyor 360.

Figure 7:
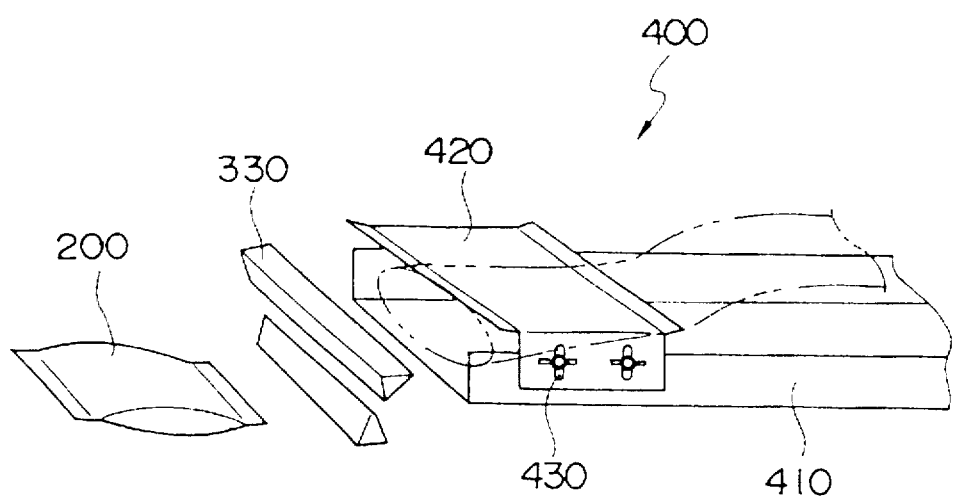
FIG. 7 is a perspective view showing the structure of the air adjusting device.

FIG. 7 is a perspective view showing the structure of the air adjusting device 400.

The rectangular tube shaped sheet material is fed inside a gutter shaped guide 410 of the bag forming device, through an air adjusting device 400, which is an area where a plate 420 covers the top section of the guide 410. The height of the cover 420 against the guide 410 can be adjusted by adjusting screws 430.

While passing through this device, the thickness of the tubular sheet material is adjusted.

Then, the sheet material is cut into individual bags by the end sealer/cutter 330, and the cushioning material 200, which is the product, is completed.

As explained above, this invention enables continuous automatic manufacturing of sealed bag type cushioning material filled with an appropriate amount of air using sheet polyvinyl alcohol (PVA) laminated high density paper as a raw material.

The size of the cushioning material and the amount of filled air can be freely controlled.

We claim:

1. Apparatus for manufacturing cushioning material from a sheet of polyvinyl alcohol laminated paper, said apparatus comprising a feeder for feeding out a sheet material of polyvinyl alcohol laminated paper from a material roll; a pipe member; means for guiding the fed sheet material around the pipe member to form the sheet material into a tubular shape, with the pipe member located inside the tubular shaped material; a seam sealer for sealing both edges of the tubular shaped material; a blower for blowing air into the tubular shaped material; an end sealer/cutter for sealing opposite sides of the tubular shaped material and cutting the tubular shaped material at the resulting seals to provide individual bag shaped cushioning material; and an air adjusting device for controlling the amount of air filled inside the bag shaped cushioning material.

2. Apparatus for manufacturing cushioning material as claimed in claim 1, in which the pipe member, the seam sealer, the end sealer/cutter and the air adjusting device are arranged vertically.

3. Apparatus as claimed in claim 2, in which the air adjusting device comprises a pair of adjusting plate members positioned to define a gap therebetween for passage of the tubular shaped material; and an adjusting mechanism for adjusting the size of the gap to control the amount of air in the tubular shaped material.

4. Apparatus for manufacturing cushioning material as claimed in claim 1, in which the pipe member, the seam sealer, the end sealer/cutter and the air adjusting device are arranged horizontally.

5. Apparatus for manufacturing cushioning material as claimed in claim 4, in which the air adjusting device comprises a gutter shaped guide member for guiding the tubular shaped material to the end sealer/cutter; a plate member which covers the top section of the guide member upstream of the end sealer/cutter; and an adjusting mechanism for adjusting the height of the plate member above the guide member to control the amount of air in the tubular shaped material.

6. Apparatus for manufacturing cushioning material as claimed in claim 1, in which the air adjusting device adjusts the tubular shaped material thickness in cooperation with the end sealer/cutter.

7. Apparatus for manufacturing cushioning material as claimed in claim 1, in which the air adjusting device adjusts the tubular shaped material thickness by passing the tubular shaped material between a plate member and a further member.

8. Apparatus as claimed in claim 1, in which the air adjusting device comprises a pair of adjusting plate members positioned to define a gap therebetween for passage of the tubular shaped material; and an adjusting mechanism for adjusting the size of the gap to control the amount of air in the tubular shaped material.

9. Apparatus for manufacturing cushioning material as claimed in claim 1, in which the air adjusting device comprises a gutter shaped guide member for guiding the tubular shaped material to the end sealer/cutter; a plate member which covers the top section of the guide member upstream of the end sealer/cutter; and an adjusting mechanism for adjusting the height of the plate member above the guide member to control the amount of air in the tubular shaped material.

* * * * *